United States Patent [19]

Yamashita

[11] Patent Number: 5,463,734
[45] Date of Patent: Oct. 31, 1995

[54] MULTIPROCESSING SYSTEM FOR EXCHANGING RUNNING-STATE INFORMATION BY ENCODING THE INFORMATION INTO AN ADDRESS FOR TRANSMISSION BETWEEN PROCESSORS

[75] Inventor: Yoshiomi Yamashita, Nagoya, Japan

[73] Assignee: Mitsubishi Denki Kabushiki Kaisha, Tokyo, Japan

[21] Appl. No.: 1,626

[22] Filed: Jan. 7, 1993

[30] Foreign Application Priority Data

Jan. 10, 1992 [JP] Japan ..................... 4-002982

[51] Int. Cl.⁶ .................. G06F 7/04; G06F 7/20
[52] U.S. Cl. ................. 395/200.19; 395/200.17; 395/410; 395/285; 340/825.06; 364/229; 364/228; 364/260.1; 364/260.4; 364/DIG. 1
[58] Field of Search ..................... 395/325, 275; 370/85.1; 340/825.6

[56] References Cited

U.S. PATENT DOCUMENTS 4,141,006  2/1979  Braxton ..................... 379/40
4,195,344  3/1980  Yamazaki ..................... 364/200
4,270,167  5/1981  Koehler et al. ..................... 364/200
4,468,738  8/1984  Hansen et al. ..................... 395/325
4,706,245  11/1987  Suzuki et al. ..................... 370/85.1

OTHER PUBLICATIONS

European Search Report (1st Action of Application in Germany).

Primary Examiner—Thomas C. Lee
Assistant Examiner—Felicia Ives
Attorney, Agent, or Firm—Sughrue, Mion, Zinn, Macpeak & Seas; Richard C. Turner; Peter A. McKenna

[57] ABSTRACT

In a multiprocessing system which is composed of a plurality of processors, running states of the respective processors are converted to address information which is transmitted to a receiving side processor. The address information is converted to a corresponding running-state code by the receiving-side processor. Thereafter, the running-state code and a beforehand set running-state discrimination code are collated with each other, to recognize the running states of the respective processors.

9 Claims, 8 Drawing Sheets 5,463,734

MULTIPROCESSING SYSTEM FOR EXCHANGING RUNNING-STATE INFORMATION BY ENCODING THE INFORMATION INTO AN ADDRESS FOR TRANSMISSION BETWEEN PROCESSORS

FIELD OF THE INVENTION

The present invention relates to a method of and an apparatus for communicating running-state information in a multiprocessing system in which a plurality of units or subsystems are connected to each other through a communication path.

BACKGROUND OF THE INVENTION

FIG. 8 of the attached drawings is an arrangement view of a conventional information processing system which is shown in "Realization Technique Of Hyperparallel Machine" published in *Information Processing* (Vol. 32, No. 4, PP 367, 1991), for example. In FIG. 8, the reference numeral $61a$–$61c$ denote processors; $62a$–$62c$, memories connected respectively to the processors $61a$–$62c$; 63, a uniform inter-coupling network (global bus) which has the memories $62a$–$62c$ and by which the processors $61a$–$61c$ are connected to each other through local buses $64a$–$64c$. The memories $62a$–$62c$, connected to each other by the inter-coupling network (global bus) 63, form a distributed-type covalent memory.

Operation will next be described. The processors $61a$–$61c$ are operable independent of each other. However, it is required that all the processors $61a$–$61c$ execute an operation as a unified whole. Processing will proceed while the running states of the respective related processors $61a$–$61c$ are held. An exchange of running-state information between the processors $61a$–$61c$ is realized by the use of the memories $62a$–$62c$, through the inter-coupling network (global bus) 63. When a processor $61a$–$61c$ executes a transmission through the inter-coupling network 63 (global bus), a transmitting processor name and running-state information serve as transmitted data. The receiving processor decodes the transmitted data, and recognizes the identity and running state of the transmitting processor.

The conventional running-state information transmitting apparatus for the multiprocessing system, constructed as described above has the following problems. Specifically, since each of the processors $61a$–$61c$ are required to transmit the running-state information separately from each other, a lot of time is required for transmittal processing of the running-state information for transmission. In addition, since the inter-coupling network is occupied during transmission of the running-state information, the time allotted for original processing is reduced so that throughput of the system is lowered. Further, since a recognition of the running state of the transmitting processor is executed by-software processing a considerable amount of processing time at the receiving side processor is required.

SUMMARY OF THE INVENTION

It is an object of the invention to provide a method of and an apparatus for communicating running-state information in a multiprocessing system in which a number of accesses can be reduced with respect to an inter-coupling network, and the time required for detection of a running state of a transmitting processor can be reduced.

According to the invention, there is provided a method of communicating running-state information, in a multiprocessing system which is composed of a plurality of processors. According to the method, running states are converted by each of the respective processors into address information, which is then transmitted to exchange address information Each receiving processor converts the address information into a corresponding running-state code based on a preset list of codes and address infomation.

The corresponding running state code and a previously set running-state discrimination code are then collated with each other so that the receiving processor recognizes the running states of the respective transmitting processors.

According to the invention, there is further provided an apparatus for communicating running-state information, in a multiprocessing system which is composed of a plurality of processors. The apparatus includes a first converting device for converting running states of the respective processors to address information. A communication path is provided through which the address information converted by the first converting device is transmitted from processor to processor. A second converting device is included. The second converting device converts the address information transmitted through the communication path into a corresponding running-state codes. The apparatus also includes a recognizing device for collating the running-state code converted by the second converting device and a previously set running-state discrimination code with each other, so that the processors recognize each other's running states.

Preferably, the first converting device is formed by a plurality of encoders. Further, preferably, the second converting device is formed by a plurality of decoders. Preferably, the first and second converting devices are incorporated in the processors.

Preferably, the first converting device comprises a running-state code mapping memory for converting state discrimination codes of the respective processors to a running-state discrimination code address, a running-state discrimination code memory for converting the running-state discrimination code address converted by the running-state code mapping memory, to a running-state discrimination code, a processor discrimination code register for outputting a processor discrimination code, and a processor running-state code output register for outputting a processor running-state discrimination code generated by composition of the running-state discrimination code and the processor discrimination code, to the communication path.

Further, preferably, the second converting device comprises a processor running-state discrimination code input register for inputting the processor running-state discrimination code from the communication path, to separate the processor running-state discrimination code into a running-state discrimination code and a processor discrimination code, a state discrimination code mapping memory for converting a running-state discrimination code separated by the processor running-state discrimination code input register, to a running-state discrimination code address, a state discrimination code memory for converting the running-state discrimination code address converted by the state discrimination code mapping memory to a state discrimination code, a processor discrimination code mapping memory for converting the processor discrimination code separated by the processor running-state discrimination code input register to a processor discrimination code address, and a state discrimination code memory for converting the processor discrimination code address converted by the processor discrimination code mapping memory to a processor discrimination code.

With the arrangement of the invention, the running states of the respective processors are converted to address information which is transmitted, the address information is converted to the falling or corresponding running-state code by the receiving-side processor, and the running-state code and the previously set running-state discrimination codes are collated with each other to recognize the running states of the respective processors.

As described above, according to the method of and the apparatus for communicating running-state information in the multiprocessing system, the running states of the respective processors are converted to address information which is transmitted, and the address information is converted to the corresponding running-state code by the receiving-side processor, and the running-state code and the beforehand set running-state discrimination codes are collated with each other to recognize the running states of the respective processors. Accordingly, a number of accesses can be reduced with respect to the inter-coupling network, and time required for detection of the running state of the transmitting-origin processor can be reduced.

Other objects and features of this invention will become understood from the following description with reference to the accompanying drawings.

DESCRIPTION OF THE EMBODIMENTS

Figure 1:
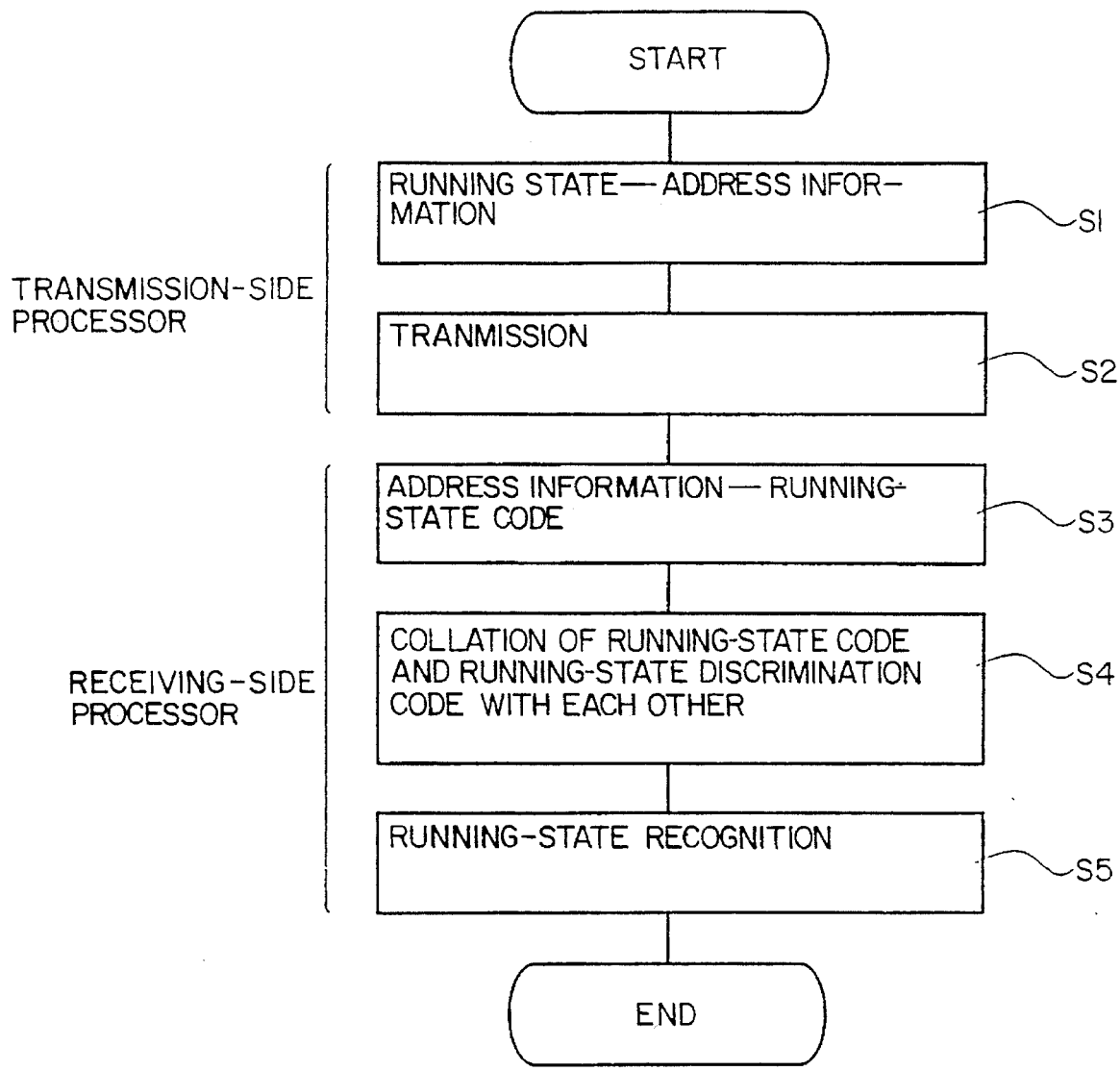
FIG. 1 is a flow chart showing a processing operation of a method of transmitting running-state information, in a multiprocessing system, according to the invention.

Referring first to FIG. 1, there is shown, in a flow chart, the processing operation of a method of communicating running-state information in a multiprocessing system, according to the invention. First, a running state of a processor is converted to address information (S1). The converted address information is transmitted to other processors through communication paths such as system buses or similar means (S2). A receiving-side processor converts the aforesaid address information to a corresponding running-state code (S3). The running-state code and a previously set running-state discrimination codes are collated with each other (S4), and a running state of the transmitting-side processor is recognized (S5).

Figure 2:
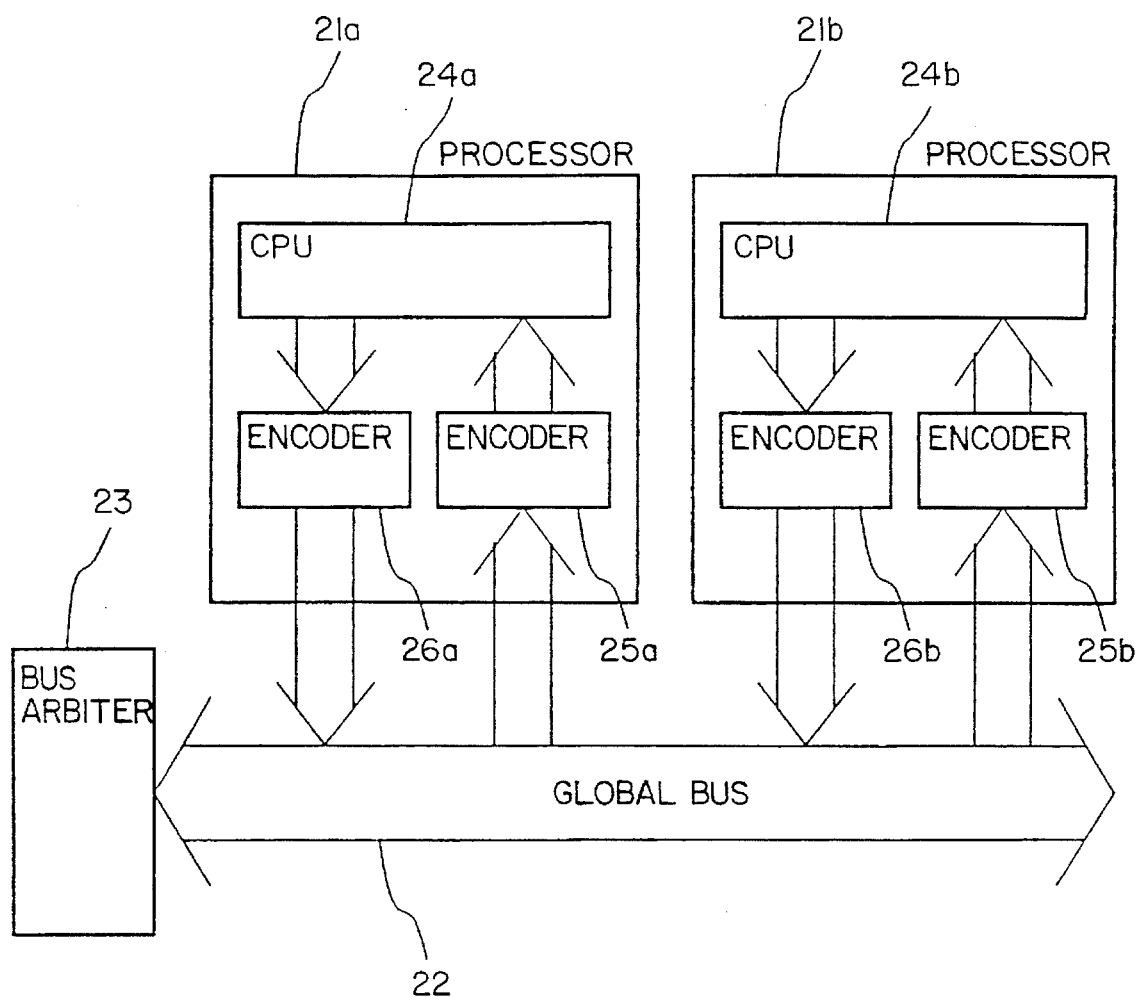
FIG. 2 is a block diagram showing a schematic arrangement of an apparatus for transmitting running-state information in a multiprocessing system, according to the invention.

FIG. 2 is a block diagram showing a schematic arrangement of an apparatus for communicating the running-state information in the multiprocessing system, according to the invention. The reference numerals 21a and 21b denote processors which cooperate with each other to form the multiprocessing system; 22, a system bus for realizing data communication within the multiprocessing system; 23, a bus arbiter for determining or deciding an access right of the system bus 22; 24a and 24b, CPUs within the respective processors 21a and 21b; 25a and 25b, processor running-state information decoders for generating running-state information codes on the basis of data transmitted from the processors 21a and 21b, to supply the running-state information codes to the CPUs 24a and 24b; and 26a and 26b, processor running-state information encoders for converting the running states of the respective processors 21a and 21b to running-state information codes.

Figure 3:
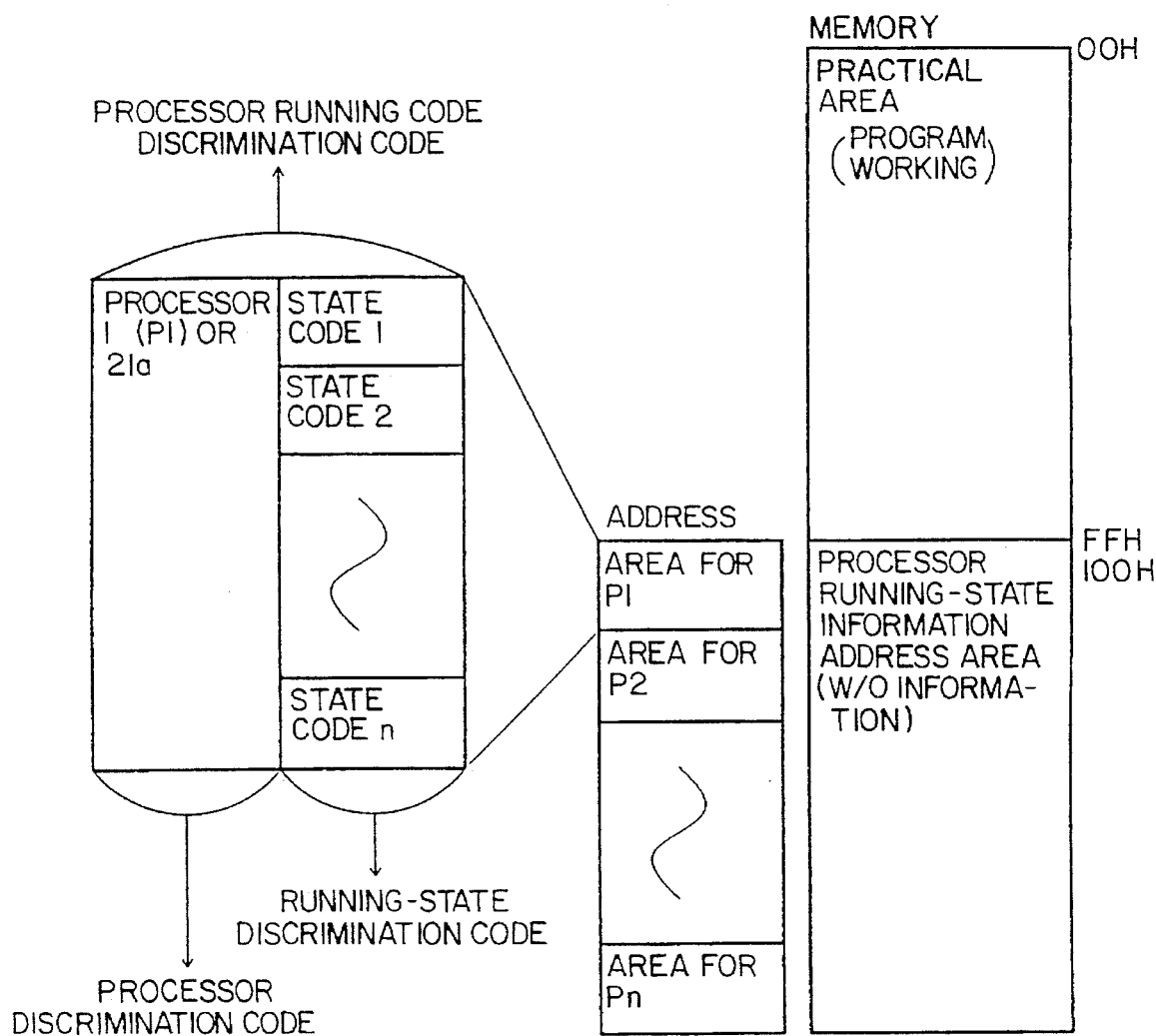
FIG. 3 is a view showing an arrangement of the running-state information in a multiprocessing system according to the invention.

FIG. 3 shows a structure or arrangement of the processor running-state information codes which are used in the case where the apparatus shown in FIG. 2 carries communication of the processor running-state information into practice.

Figure 4:
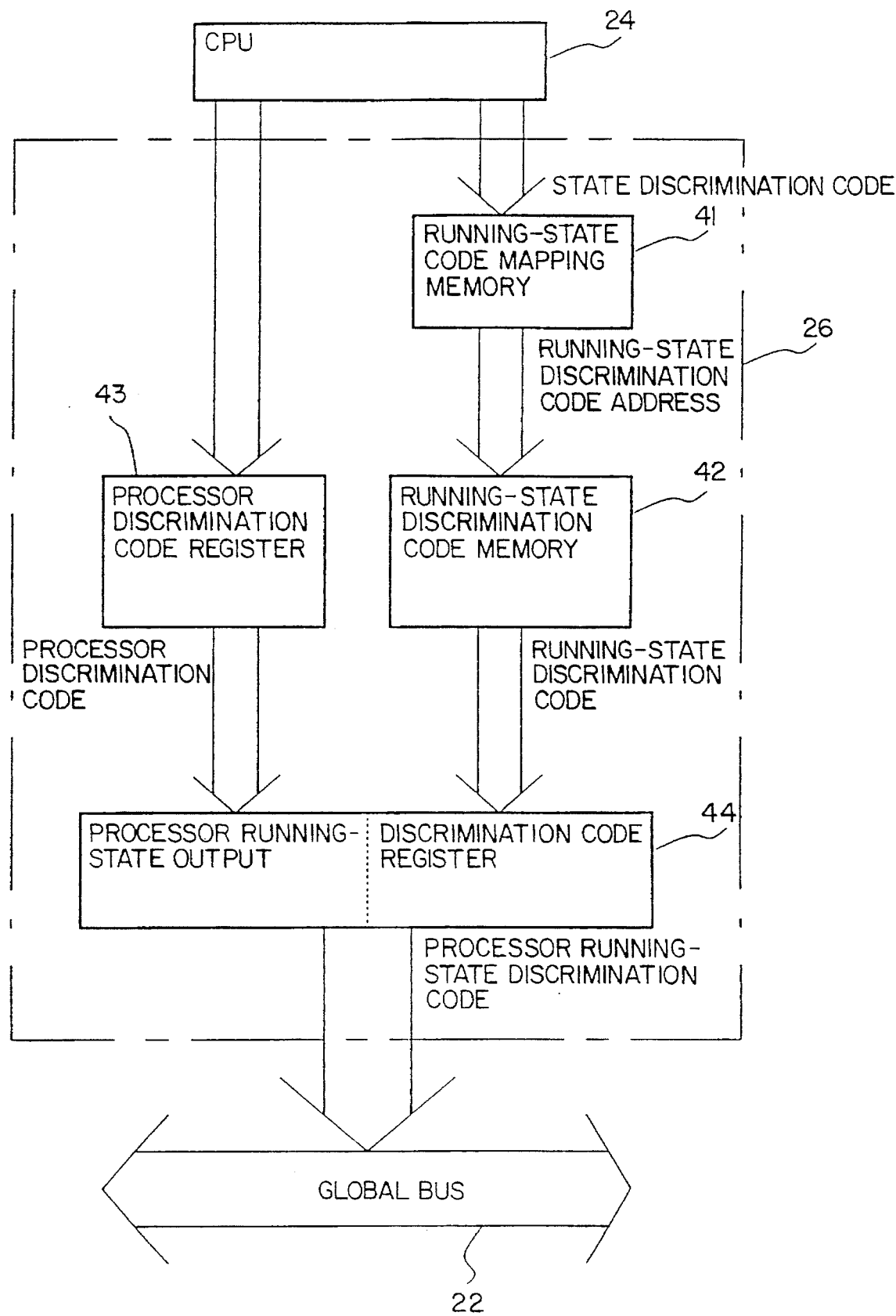
FIG. 4 is a block diagram showing an arrangement of an encoder illustrated in FIG. 2.

In FIG. 4, the reference numeral 41 denotes a running-state code mapping memory for converting the state discrimination code unique to the CPU 24 to a running-state discrimination code address which stores therein a running-state discrimination code, which is used throughout the entire system; 42, a running-state discrimination code memory in which the running-state discrimination code used throughout the entire system is stored; 43, a processor discrimination code register for storing therein the processor discrimination code which is beforehand allotted to the processor 21; and 44, a processor running-state discrimination code output register in which the running-state discrimination code used throughout the entire system and the processor discrimination code are synthesized or compounded with each other, thereby generating the processor running-state discrimination code.

Figure 5:
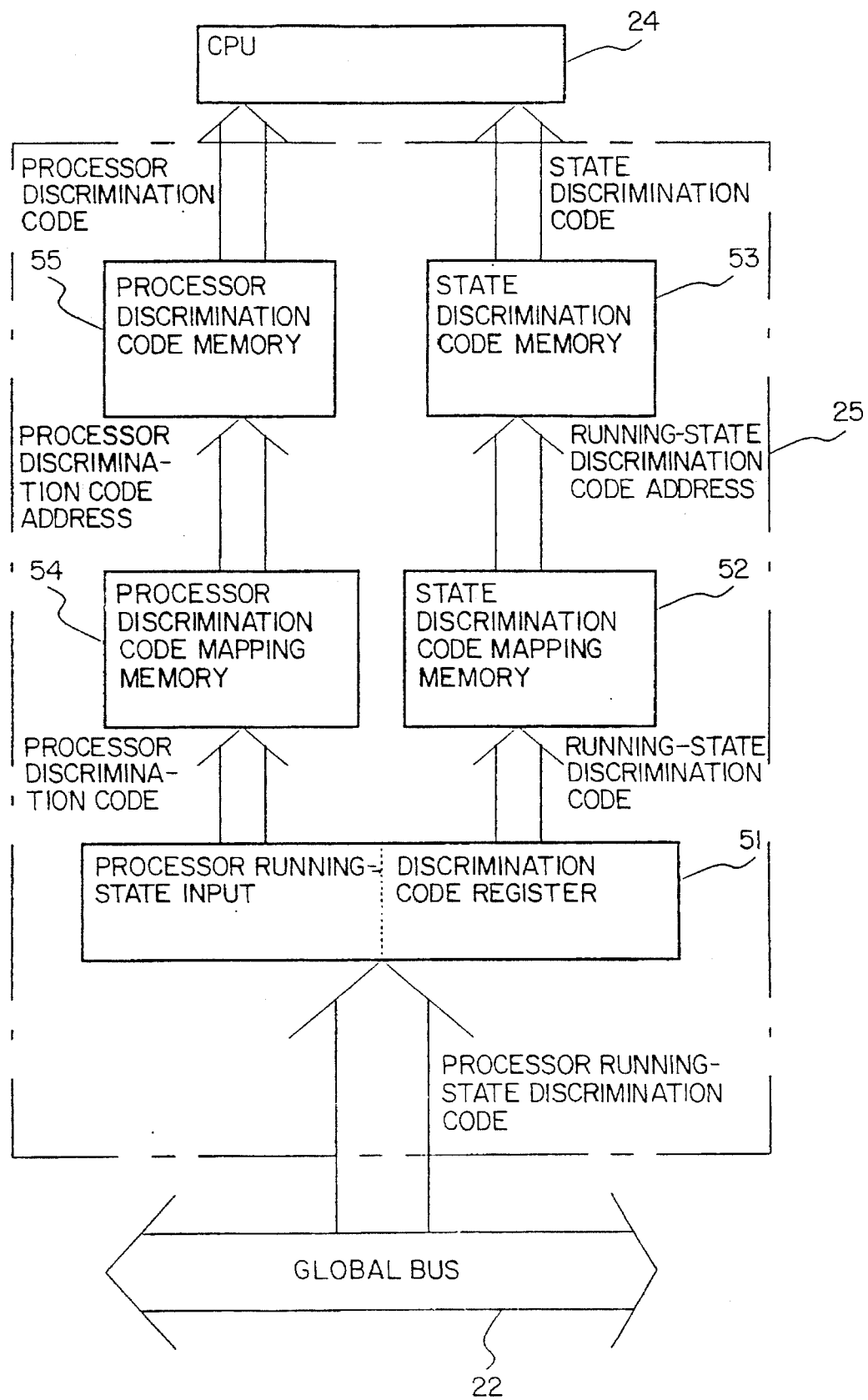
FIG. 5 is a block diagram showing an arrangement of a decoder illustrated in FIG. 2.

In FIG. 5, the reference numeral 51 denotes a processor running-state discrimination code input register for reading the processor running-state discrimination code which is outputted onto the system bus 22; 52, a state discrimination code mapping memory for converting the running-state discrimination code used throughout the entire system, to the state discrimination code address in which the state discrimination code unique to each CPU 24 is stored; 53, a state discrimination code memory in which the state discrimination code unique to the receiving CPU 24 is stored; 54, a processor discrimination code mapping memory for converting the processor discrimination code used throughout the entire system, to a processor discrimination code address unique to the receiving CPU 24; and 55, a state discrimination code memory in which an actual processor discrimination code unique to the receiving CPU 24 is stored.

Next, the running-state information communication method in the above-described multiprocessing system will be described by reference to FIGS. 2–5. A designer makes the following settings ① and ② when the system is first designed:

① All the states which can actually be run taken by each processor 21a or 21b during execution is previously allotted as a "running-state discrimination code" which is applied to the entire system. The possible states include but are not limited to sleep, interrupt, idle, wait, and halt times.

② Independent addresses are allotted to the respective processors 21a and 21b, i.e., and for P1 and P2.

This state is illustrated in FIG. 3. The "running-state discrimination code" shown in FIG. 3 is decided when the above-described setting ① has been completed. The "processor discrimination code" shown in FIG. 3 is decided when the above-described setting ② has been completed. The processor discrimination code is such that the processors 21a and 21b are classified on the basis of the type or kind of CPUs 24a and 24b that are used, the position on the bus, positioning on the system, and similar information. In this manner, it is possible to identify the processors 21a and 21b uniquely. Accordingly, the "processor running-state discrimination code" shown in FIG. 3 is decided when both the aforesaid steps ① and ② have been completed. A "practical area" within the memory is a portion of memory which is used as a program area or a work area. On the other hand, a "processor running-state information address area" is an area to which the processor running-state discrimination code is allotted, and an area of only an address area in which an actual information does not exist. This is an area in which only code is stored and other information or data does not exist. The processors 21a and 21b share the same memory area in common. As a result, the running states of all the respective processors P1–Pn connected onto the system bus 22 are identified uniquely by a simple investigation of the address information on the system bus.

As described above, the processors 21a and 21b that are connected onto the system bus 22 will output the processor running-state discrimination codes in which the running-state discrimination codes and the processor discrimination codes are combined with each other, onto the system bus 22 as address information. In this manner, the running states can simultaneously be distributed with respect to all the processors 21 connected to the system bus, without execution of a data transmission.

Next, operation of the running-state information communication apparatus of the above-described multiprocessing system will be described by further reference to FIGS. 2–4 of the drawings. The processors 21a and 21b will transmit the running-state information, such as the above-listed states and similar states, onto the global bus 22. To this end the running-state information processed by the CPUs 24a and 24b is first forwarded by the CPU's to the processor running-state information encoders 26a and 26b respectively. A processor running-state information encoder 26 generates the corresponding running-state discrimination codes as shown in FIG. 4. Then, the running-state discrimination codes and the processor discrimination codes for recognizing the transmitting-origin processor names are combined to generate the processor running-state discrimination codes.

Referring to Fig.4, the running states, which may be recognized by any of the CPUs 24, are outputted to the address of the running-state code mapping memory 41, as the state discrimination code unique to each CPU 24. The state discrimination code unique to the CPU 24 is converted to a running-state discrimination code address by running-state code mapping memory 41. At this memory address is stored the running-state discrimination code passing through the entire system. The code is outputted by memory 41 to the running-state discrimination code memory 42 in which the running-state discrimination code passing through the entire system is stored, as address information. As the output from the running-state discrimination code memory 42, there is obtained or produced a running-state discrimination code which actually will pass through the entire system.

In addition, the "processor discrimination code" is allotted beforehand to the processor 21. Accordingly, the processor discrimination code stored in the processor discrimination code register 43 is outputted as prestored. The thus obtained running-state discrimination code and processor discrimination code are combined by the processor running-state discrimination code output register 44. As a result, a processor running-state discrimination code passing through the entire system will be generated.

After generation of the processor running-state discrimination code has been completed, the transmission-origin processor 21a or 21b will demand access to the system bus 22 by signaling the bus arbiter 23. After the transmission-origin processor 21a or 21b has the access right, the processor running-state discrimination code is outputted from register 44 onto the system bus 22, as address information. The processor running-state information decoder 25 of each other processor 21a or 21b connected to the system bus 22 inputs the processor running-state discrimination code from the system bus 22. Then, the processor running-state discrimination code is decoded, whereby the processor discrimination code of the transmission origin and the running-state discrimination code are generated and are transmitted to the corresponding CPU 24.

Referring to FIG. 5, the CPU 24 within the receiving-side processor 21 recognizes the running state of the transmission-origin processor 21 on the basis of the transmission-origin processor discrimination code and the running-state discrimination code. The processor running-state discrimination code outputted onto the system bus 22 is read into the processor running-state discrimination code input register 51, and is separated into the processor discrimination code and the running-state discrimination code.

The running-state discrimination code is outputted to the address of the state discrimination code mapping memory 52 as the running-state discrimination code which passes through the entire system. The running-state discrimination code passing through the entire system is converted to the running-state discrimination code address in which the state discrimination code unique to the CPU 24 is stored, by the state discrimination code mapping memory 52, and is outputted to the state discrimination code memory 53 in which the actual state discrimination code unique to the CPU 24 is stored, as address information. As an output from the state discrimination code memory 53, there is obtained or produced the actual state discrimination code unique to the CPU 24.

On the other hand, the processor discrimination code, which passes through the entire system, is converted to the processor discrimination code address unique to the CPU 24, by the processor discrimination code mapping memory 54, and is outputted to the state discrimination code memory 55 in which the actual processor discrimination code is stored, unique to the CPU 24. As the output from the state discrimination code memory 55, there is obtained the actual processor discrimination code unique to the CPU 24. By the thus obtained state discrimination code and processor discrimination code unique to the CPU 24, the CPU 24 recognizes the running state of the associated processor 21.

Figure 6:
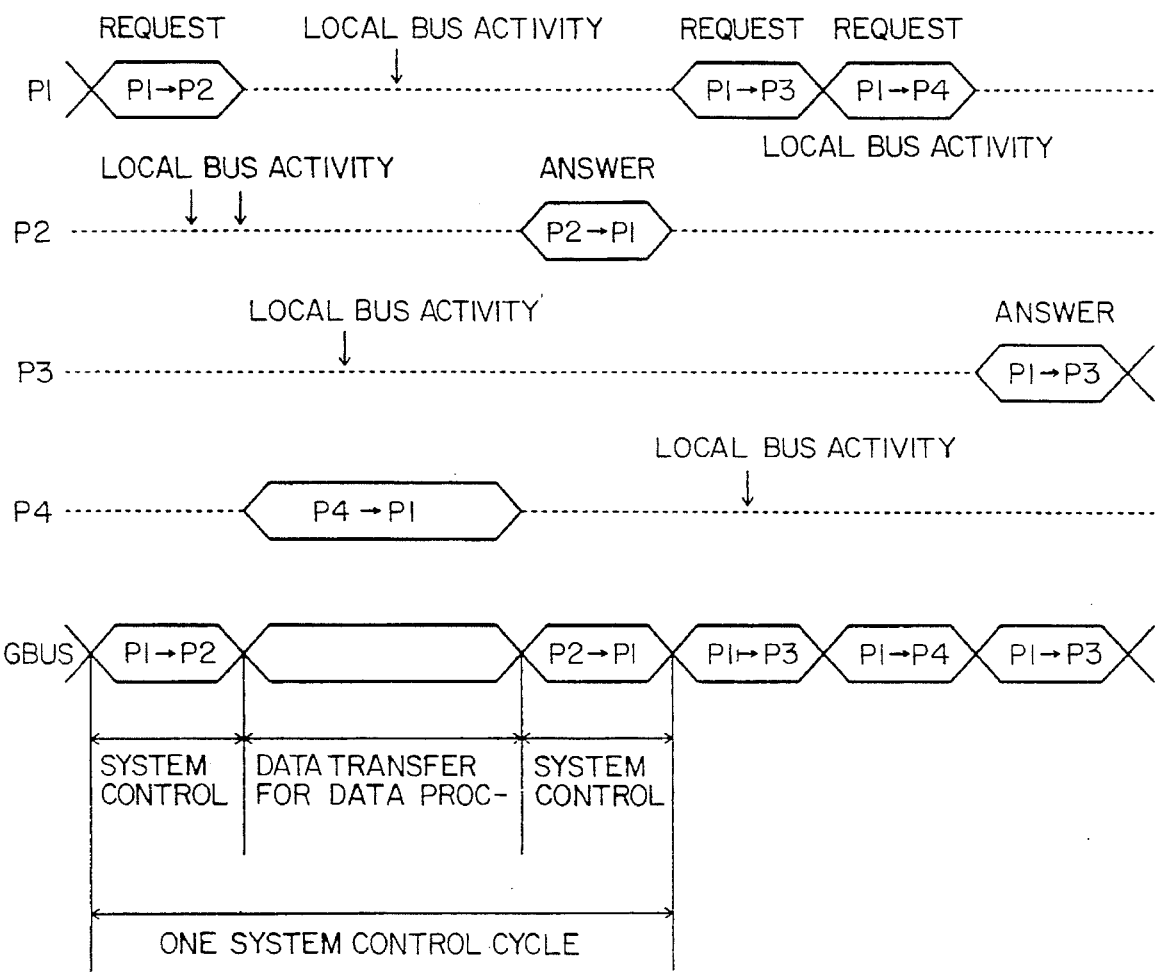
FIG. 6 is a timing diagram showing an operation and effect of this invention.

Detailed operation and effects of the invention will next be described by using FIG. 6 and FIG. 7. As shown in FIG. 6, each processor P1–P4 can output a request or an answer onto the global bus (GBUS) through each local bus. As shown at the contents of the global bus, there are a system control(P1→P2), a data transfer for data processing and a system control(P2→P1) in one system control cycle, an effective time which means the time using data processing increases.

Figure 7:
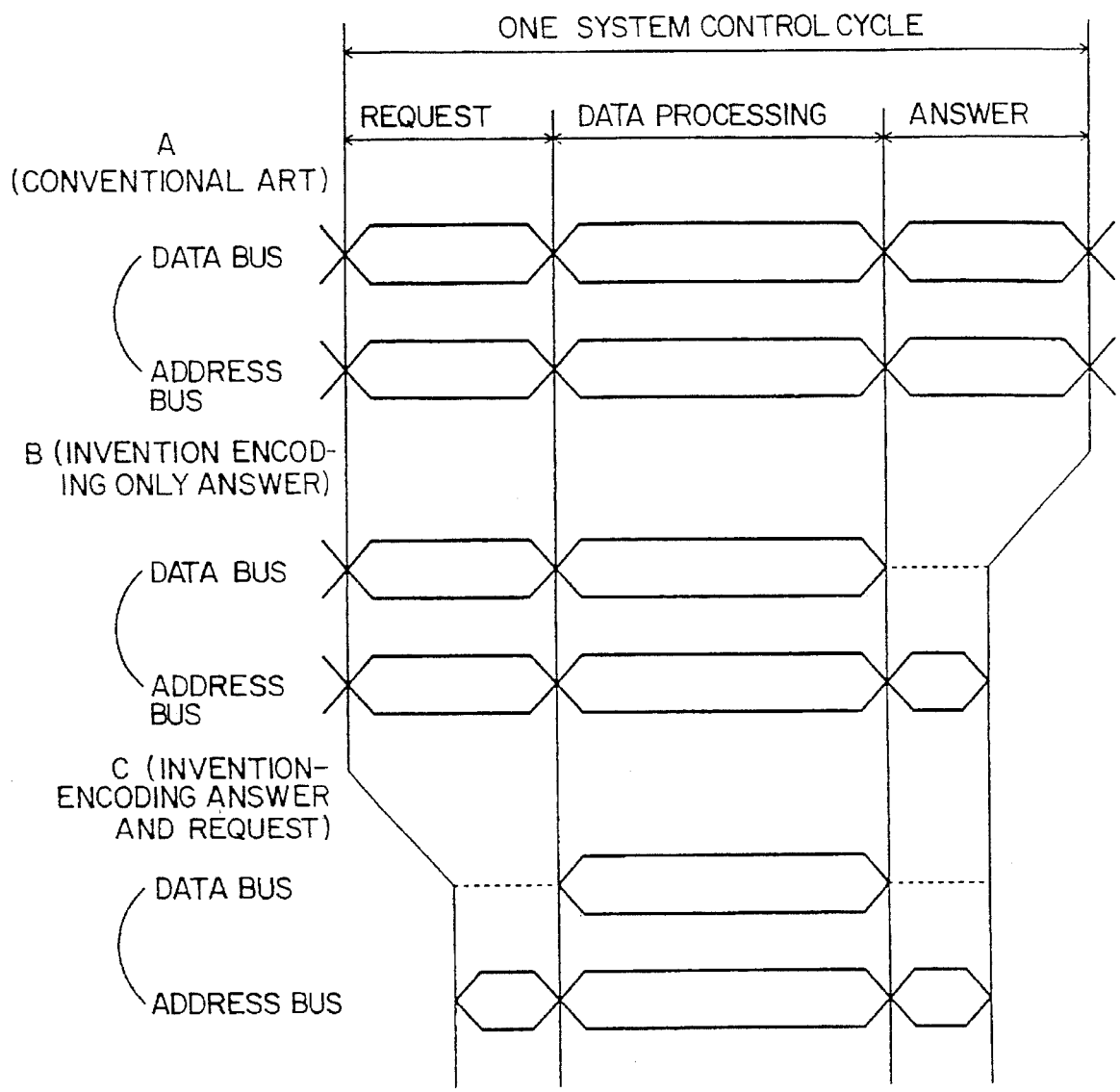
FIG. 7 is a timing diagram showing an operation and effect of this invention.
Figure 8:
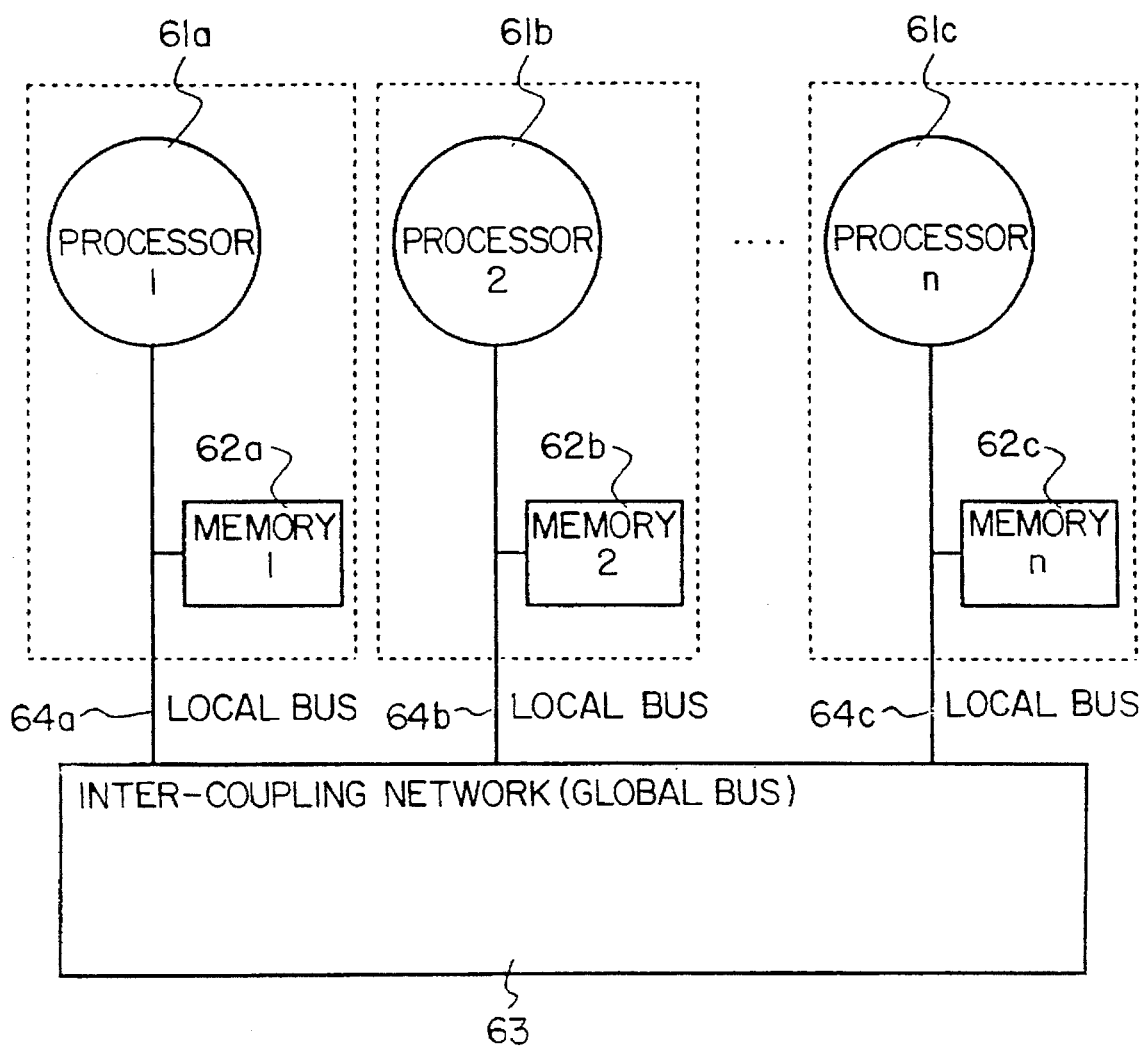
FIG. 8 is a block diagram showing a schematic arrangement of a conventional apparatus for transmitting running-state information in a multiprocessing system.

FIG. 7 shows that a necessary time for "one system control cycle" in the conventional art and the invention. As shown in FIG. 7, signal set A illustrates the time required for use of the data bus and address bus in the conventional system. Signal set B illustrates the time required when the answer is encoded in accordance with the present invention. Signal set C illustrates the use of the invention for encoding the answer and request. Clearly, the use of code on the address bus are not data results in significant time savings. Specifically, it is possible to transfer a running-state of a processor as one address information (code), not as data. As a result, the transfer time of processor running-state information and the processing time of a processor running-state discrimination are drastically cut down.

In connection with the above, the running-state information communication apparatus in the multiprocessing system in the above-described embodiment uses the system bus 22 as the transmitting path of the processor running-state discrimination code. However, the transmission path may be formed as a serial line or a network.

Further, if an exclusive processor running-state discrimination code transmitting bus is used, it is possible to form the processor running-state discrimination code by the use of the code space exclusive for the processor running-state discrimination information. Accordingly, transmission of the processor running-state information is made possible at a higher speed, without the address space of the covalent memory between the processors being occupied.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of communicating running-state information, in a multiprocessing system which is composed of a plurality of processors, said running-state information indicating an operating state of respective processors, said method comprising the steps of:

converting running states of the respective processors to address information;

transmitting said address information from at least one of said processors;

converting said address information to a corresponding running-state code by a receiving-side processor; and subsequently, collating said running-state information code and a running-state discrimination code with each other to recognize the running states of the respective processors.

2. The method of communicating as set forth in claim 1 wherein said discrimination code is set beforehand.

3. The method of communicating as set forth in claim 1, wherein said transmitting step is accomplished via a common bus, and said address information is bi-directionally transmitted from said at least one of said processors to all other said processors.

4. An apparatus for communicating running-state information, in a multiprocessing system which is composed of a plurality of processors, said running-state information indicating an operating state of respective processors, said apparatus comprising:

first converting means for converting running states of the respective processors to address information;

a communication path through which said address information converted by said first converting means is bi-directionally transmitted;

second converting means for converting said address information transmitted through said communication path to a corresponding running-state code; and recognizing means for collating said running-state code converted by said second converting means and a previously set running-state discrimination code with each other to recognize the running states.

5. An apparatus for communicating running-state information, in a multiprocessing system, according to claim 4, wherein said first converting means comprises a plurality of encoders.

6. An apparatus for communicating running-state information, in a multiprocessing system, according to claim 4, wherein said second converting means comprises plurality of decoders.

7. An apparatus for communicating running-state information, in a multiprocessing system, according to claim 4, wherein said first and second converting means are incorporated in said processors.

8. An apparatus for communicating running-state information, in a multiprocessing system, according to claim 4, wherein said first converting means comprises a running-state code mapping memory for converting state discrimination codes of the respective processors to a running-state discrimination code address, a running-state discrimination code memory for converting the running-state discrimination code address converted by said running-state code mapping memory, to a running-state discrimination code, a processor discrimination code store for outputting a processor discrimination code, and a processor running-state code output store for outputting a processor running-state discrimination code generated by composition of said running-state discrimination code and said processor discrimination code, to said communication path.

9. An apparatus for communicating running-state information in a multiprocessing system, according to claim 4, wherein the second converting means comprises:

a processor running-state discrimination code input store for inputting a processor running-state discrimination code from said communication path to separate said processor running-state discrimination code into a running-state discrimination code and a processor discrimination code;

a state discrimination code mapping memory for converting said running-state discrimination code separated by said processor running-state discrimination code input store to a running-state discrimination code address;

a first state discrimination code memory for converting the running-state discrimination address converted by said state discrimination code mapping memory to a state discrimination code;

a processor discrimination code mapping memory for converting the processor discrimination code separated by said processor running-state discrimination code input store to a processor discrimination code address; and a second state discrimination code memory for converting the processor discrimination code address converted by said processor discrimination code mapping memory to said processor discrimination code.

\* \* \* \* \*